(12) United States Patent
Huang et al.

(10) Patent No.: US 7,962,735 B2
(45) Date of Patent: Jun. 14, 2011

(54) SERVO DEVICE AUTO-BOOTED UPON POWER SUPPLY RECOVERY AND METHOD THEREOF

(75) Inventors: Kuo-Wei Huang, Taipei (TW); E-Min Lin, Taipei (TW)

(73) Assignee: Inventec Corporation, Taipei (TW)

( * ) Notice: Subject to any disclaimer, the term of this patent is extended or adjusted under 35 U.S.C. 154(b) by 498 days.

(21) Appl. No.: 12/145,757

(22) Filed: Jun. 25, 2008

(65) Prior Publication Data

US 2009/0276615 A1  Nov. 5, 2009

(30) Foreign Application Priority Data

May 2, 2008 (TW) .............................. 97116250 A

(51) Int. Cl.
*G06F 9/00* (2006.01)
*G06F 9/24* (2006.01)
*G06F 15/177* (2006.01)

(52) U.S. Cl. ................ 713/1; 713/2; 713/100; 717/168; 709/223

(58) Field of Classification Search .................. 713/1, 2, 713/100; 717/168; 709/223
See application file for complete search history.

(56) References Cited

U.S. PATENT DOCUMENTS

| | | | | | |
|---|---|---|---|---|---|
| 5,854,905 | A | * | 12/1998 | Garney | 710/104 |
| 6,167,532 | A | * | 12/2000 | Wisecup | 714/23 |
| 6,317,828 | B1 | * | 11/2001 | Nunn | 713/2 |
| 2003/0084307 | A1 | * | 5/2003 | Schwartz | 713/189 |
| 2007/0186086 | A1 | * | 8/2007 | Lambert et al. | 713/1 |

* cited by examiner

*Primary Examiner* — Abdelmoniem Elamin
(74) *Attorney, Agent, or Firm* — Tim Tingkang Xia; Morris, Manning & Martin, LLP

(57) ABSTRACT

A servo device auto-booted upon power supply recovery and a method thereof include a plurality of mainboards, a circuit board, a power supply, a memory unit, an auto-booting unit, and a switching unit. The switching unit and the memory unit storing a basic input/output system (BIOS) are disposed on the circuit board. The auto-booting unit outputs a selection signal when the power supply recovers the supply of power after an abnormal power failure, and then the switching unit transmits the BIOS to each mainboard sequentially according to the selection signal, so as to finish the auto-booting of the entire servo device.

11 Claims, 3 Drawing Sheets

SERVO DEVICE AUTO-BOOTED UPON POWER SUPPLY RECOVERY AND METHOD THEREOF

CROSS-REFERENCE TO RELATED APPLICATIONS

This non-provisional application claims priority under 35 U.S.C. §119(a) on Patent Application No(s). 097116250 filed in Taiwan, R.O.C. on May 2, 2008 the entire contents of which are hereby incorporated by reference.

BACKGROUND OF THE INVENTION

1. Field of Invention

The present invention relates to a servo device, and more particularly, to a servo device auto-booted upon power supply recovery.

2. Related Art

In the blade servo system, multiple single board server mainframes (i.e., the mainboards) are integrated into a single casing through a complete pedestal (also called a blade pedestal). The pedestal provides the functions of power supply, heat dissipation of fan, and network communication in a centralized management manner. The mainboards are inserted into the pedestal, and the entire hardware architecture looks like a blade, so the hardware architecture is named a blade servo system. In the blade servo system, all the server mainframes may share the resources, such as a power supply, a display, an input device, and a network environment. Therefore, the blade server mainframe needs fewer elements such as power supplies and fans than the environment using the multiple rack mount servo systems or tower servo systems. Since the number of the internal elements in the machine is reduced, the power consumption is greatly reduced accordingly. Furthermore, customized functions may be provided in response to the clients' requirements without changing the whole system.

A basic input/output system (BIOS) is the most basic firmware program codes stored in the computer hardware, and mainly used for Power-On Self Test (POST), initialization, recording system settings, providing a routine library, and loading an operating system. The BIOS is a micro operating system in communication with the hardware.

At present, in a blade servo system, each of the mainboards is equipped with a Read Only Memory (ROM), so as to store the BIOS used for booting.

In order to update the BIOS, the mainboard of the BIOS to be updated must be started to execute a BIOS update procedure on its ROM. However, to update all BIOS of the mainboards in the blade servo system is time-consuming and has a low efficiency.

Furthermore, at present, if the blade server system in operation suffers a power failure, all mainboards inserted into the pedestal will shut off due to the power failure. When the power supply is recovered, each mainboard must be booted manually again, which costs a lot of time.

Furthermore, if nobody finds that the power supply of the server is broken and recovered, the blade server system will stop operating for it cannot be booted automatically, thereby causing loss of clients.

SUMMARY OF THE INVENTION

In order to solve the aforementioned problem, the present invention provides a servo device auto-booted upon power supply recovery and a method thereof, so as to solve the problem in the prior art that a basic input/output system (BIOS) update procedure is complicated and the servo device cannot be booted automatically when a power supply recovers after a power failure.

The present invention provides a servo device auto-booted upon power supply recovery, which includes a plurality of mainboards, a circuit board, a power supply, a memory unit, an auto-booting unit, and a switching unit.

The circuit board is electrically connected to each mainboard. The power supply is electrically connected to the circuit board and each mainboard. The memory unit is disposed on the circuit board. The switching unit is disposed on the circuit board and electrically connected to the auto-booting unit.

The power supply is used for supplying power required by the mainboards and the circuit board to operate. The memory unit stores at least one BIOS for each mainboard to execute a booting program.

The auto-booting unit detects power supplied by the power supply. Furthermore, when the power supply recovers the supply of power after an abnormal power failure, the auto-booting unit outputs a selection signal. The switching unit transmits the BIOS in the memory unit to each mainboard sequentially according to the selection signal, thereby automatically executing the booting program again.

Furthermore, a state unit is further disposed on the circuit board. The state unit determines a use state of the BIOS used by the mainboard and generates a state signal accordingly. At this point, the auto-booting unit outputs the selection signal according to the state signal. The switching unit determines the mainboard to which the BIOS is to be transmitted according to the selection signal.

In an embodiment of the present invention, the state unit may include a register electrically connected to each mainboard.

The register is used for recording the use state of the BIOS used by the mainboard and outputs the state signal according to the recorded use state. The auto-booting unit generates a switching signal to the register when outputting the selection signal, so as to switch a record in the register.

The auto-booting unit may include a power supply state unit, a power supply recovery unit, and a selection unit.

The power supply state unit is electrically connected to the power supply recovery unit and each mainboard. The power supply recovery unit is electrically connected to the selection unit. The selection unit is electrically connected to the switching unit.

The power supply state unit records the power supply state of each mainboard. When the power supply recovers the supply of power after an abnormal power failure, the power supply recovery unit sends a control signal according to the state signal and the power supply state recorded in the power supply state unit. The selection unit outputs the selection signal according to the control signal.

In another aspect, each mainboard may further include a chip set.

The power supply state unit acquires the power supply state of the mainboard having the chip set through the chip set. The mainboard receives BIOS through the chip set. The state unit acquires the use state of the BIOS used by the mainboard having the chip set through the chip set.

The chip set may include a general purpose input/output (GPIO) and a serial peripheral interface control unit.

The power supply state unit acquires the power supply state of the mainboard having the chip through the GPIO. The state unit acquires the use state of the BIOS used by the mainboard having the chip set through the GPIO. The serial peripheral interface control unit is used for receiving the BIOS.

Furthermore, a plurality of connection units is further disposed on the circuit board. The connection units may be respectively electrically connected to one mainboard. At this point, the state unit and the switching unit communicate with the mainboards through the connection units.

The state unit and the switching unit communicate with the mainboards through the connection units. When the auto-booting unit is disposed on the circuit board, the auto-booting unit communicates with the mainboards through the connection units.

In view of the above, the servo device auto-booted upon power supply recovery provided by the present invention provides the BIOS for each mainboard by using an integratedly configured single memory unit, and outputs a selection signal through the auto-booting unit when the power supply recovers the supply of power after an abnormal power failure, so that the switching unit may transmit the BIOS to the mainboard according to the selection signal to execute an automatic booting program.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In a servo device auto-booted upon power supply recovery provided by the present invention, a pedestal provides a basic input/output system (BIOS) in a centralized management mode. In other words, a single memory unit storing the BIOS is disposed on the circuit board, and then is provided to each mainboard for use through a sharing mechanism. Furthermore, an auto-booting unit is designed to provide an automatic recovery mechanism to enable the mainboard to automatically boot and operate when the power supply recovers the supply of power after an abnormal power failure.

Figure 1:
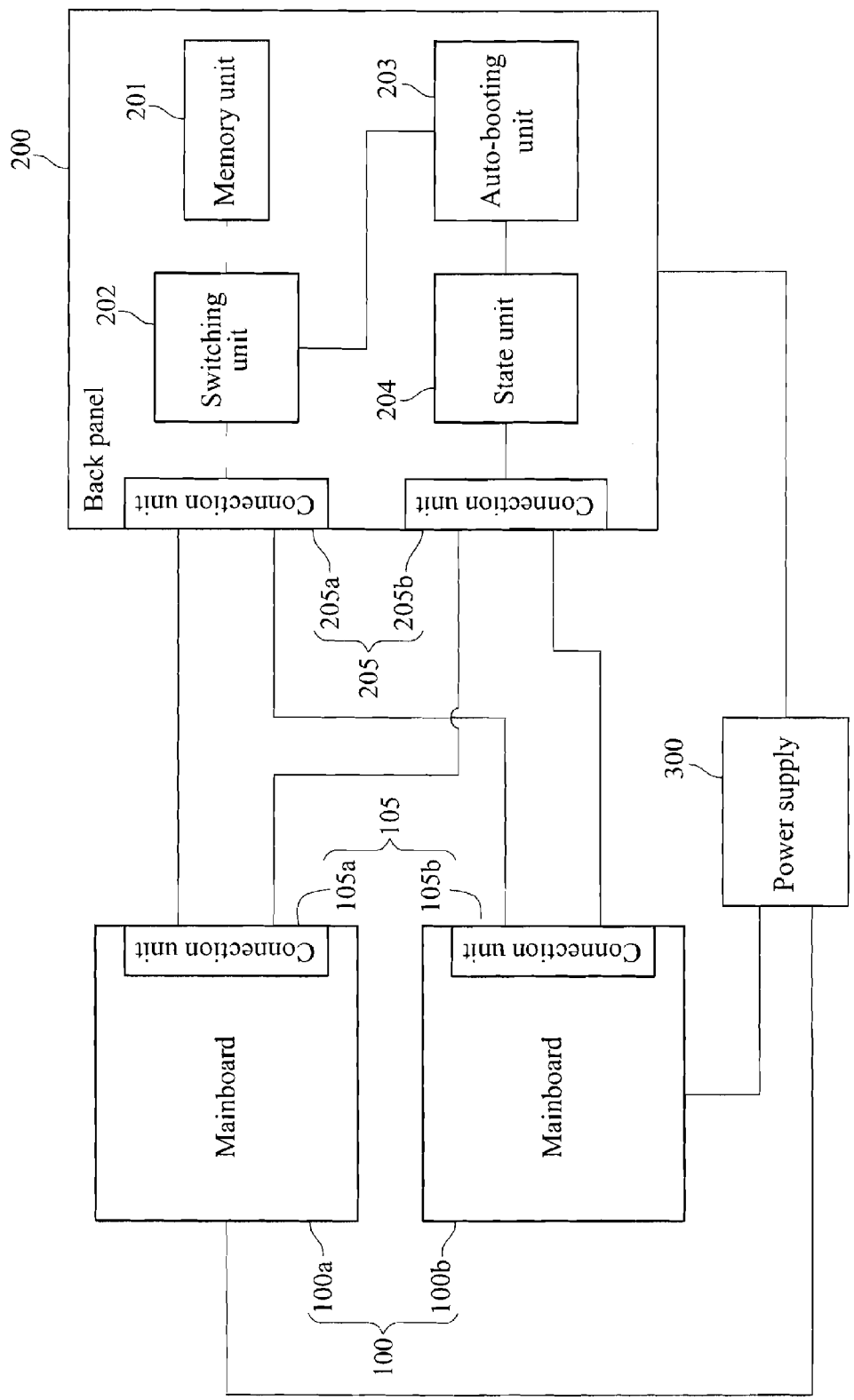
FIG. 1 is a block diagram of a servo device auto-booted upon power supply recovery according to an embodiment of the present invention.

FIG. 1 is a block diagram of a servo device auto-booted upon power supply recovery according to an embodiment of the present invention. Referring to FIG. 1, the servo device auto-booted upon power supply recovery includes a plurality of mainboards 100a and 100b (hereinafter generally called "mainboard 100") and a single pedestal (not shown). The pedestal includes a circuit board (for example: a back panel 200), a power supply 300, a memory unit 201, an auto-booting unit 203, and a switching unit 202. For convenience of illustration, the circuit board is the back panel 200 for illustration.

The back panel 200 is electrically connected to each mainboard 100. The memory unit 201 is disposed on the back panel 200. The switching unit 202 is disposed on the back panel 200 and electrically connected to the auto-booting unit 203. The power supply 300 is electrically connected to each mainboard 100 and the back panel 200.

Each mainboard 100 has a model (also called "mainboard model"). The memory unit 201 stores a plurality of BIOS entity program segments, and each BIOS entity program segment corresponds to one of the models.

For example, the memory unit 201 may store a plurality of BIOSes, and each BIOS corresponds to one mainboard model. The memory unit 11 may also store a single BIOS shared program segment and a plurality of BIOS entity program segments. Each BIOS entity program segment corresponds to one mainboard model. In other words, the BIOS shared program segment and one of the BIOS entity program segments constitute a BIOS corresponding to one mainboard model. In booting, the single BIOS shared program segment is provided for each mainboard to use sequentially. According to the corresponding mainboard model, the BIOS entity program segment is provided for the mainboard 100 with the mainboard model to use.

The power supply 300 provides power required by the mainboards 100 and the back panel 200 to operate. The auto-booting unit 203 detects power supplied by the power supply 300, and outputs a selection signal when the power supply 300 recovers the supply of power after an abnormal power failure. The switching unit 202 transmits the BIOS to one of the mainboards 100 according to the selection signal.

The switching unit 202 captures a corresponding entity program segment from the memory unit 201 according to the mainboard model of the mainboard 100 intended for receiving the BIOS and outputs the entity program segment to the mainboard 100 intended for receiving the BIOS.

The switching unit 202 may store a mapping table, which records the mainboard models, a plurality of storage addresses of the BIOS entity program segments in the memory unit 201, and the mapping relationship between the mainboard models and the storage addresses according to the corresponding BIOS entity program segment. In addition, the switching unit 202 captures the BIOS entity program segment from the memory unit 201 according to the contents recorded in the mapping table and the model of the mainboard 100 intended for receiving the BIOS.

Furthermore, as shown in FIG. 1, a state unit 204 is further disposed on the back panel 200 and electrically connected to the auto-booting unit 203 and each mainboard 100.

The state unit 204 determines a use state of the BIOS used by the mainboard 100 and generates a state signal accordingly. The auto-booting unit 203 outputs the selection signal according to the state signal, and the switching unit 202 determines the mainboard 100 to which the BIOS is to be transmitted according to the selection signal.

In addition, the servo device of the BIOS in this embodiment further includes a plurality of connection units 205a, 105a, 205b, and 105b (hereinafter generally called "connection units 105 and 205").

The connection units 105 are disposed on the mainboard 100. The connection units 205 are disposed on the back panel 200. The back panel 200 is electrically connected to one of the mainboards 100 through the connection units 105 and the connection units 205.

For example, the connection units 205a and 205b correspond to the connection units 105a and 105b, respectively. The connection units 205a and 205b are disposed on the back panel 200, respectively, while the connection units 105a and 105b are disposed on the mainboard 100, respectively. The back panel 200 and the mainboard 200 are electrically connected to each other through the corresponding connection units 205a and 105a or 205b and 105b. For example, the mainboard 100a is coupled to the connection unit 205a on the back panel 200 by using the connection unit 105a, while the mainboard 100*b* is coupled to the connection unit 205*b* on the back panel 200 by using the connection unit 105*b*.

Herein, all the elements on the back panel 200 communicate with all the elements on the mainboard 100*a* (or 100*b*) through a corresponding group of connection units 205*a* and 105*a* (or 205*b* and 105*b*). That is, the state unit 204 and the switching unit 201 communicate with the mainboard 100*a* (of 100*b*) through the connection units 205*a* and 105*a* (or 205*b* and 105*b*). The corresponding connection units 205*a* and 105*a* (205*b* and 105*b*) may be a slot or a golden finger interface, and the mainboard 100*a* (or 100*b*) is inserted into the corresponding slot in the back panel 200 via the golden finger interface, so as to form the communication between the mainboard 100 and the back panel 200. However, the corresponding connection units 205*a* and 105*a* (or 205*b* and 105*b*) may also be two bus headers, so as to form communication between the mainboard 100 and the back panel 200 through the two headers connected by the bus.

Furthermore, the communication between the back panel 200 and a mainboard 100 is achieved by a group of the connection units 105 and 205, as well as two or more groups of the connection units 105 and 205.

Figure 2:
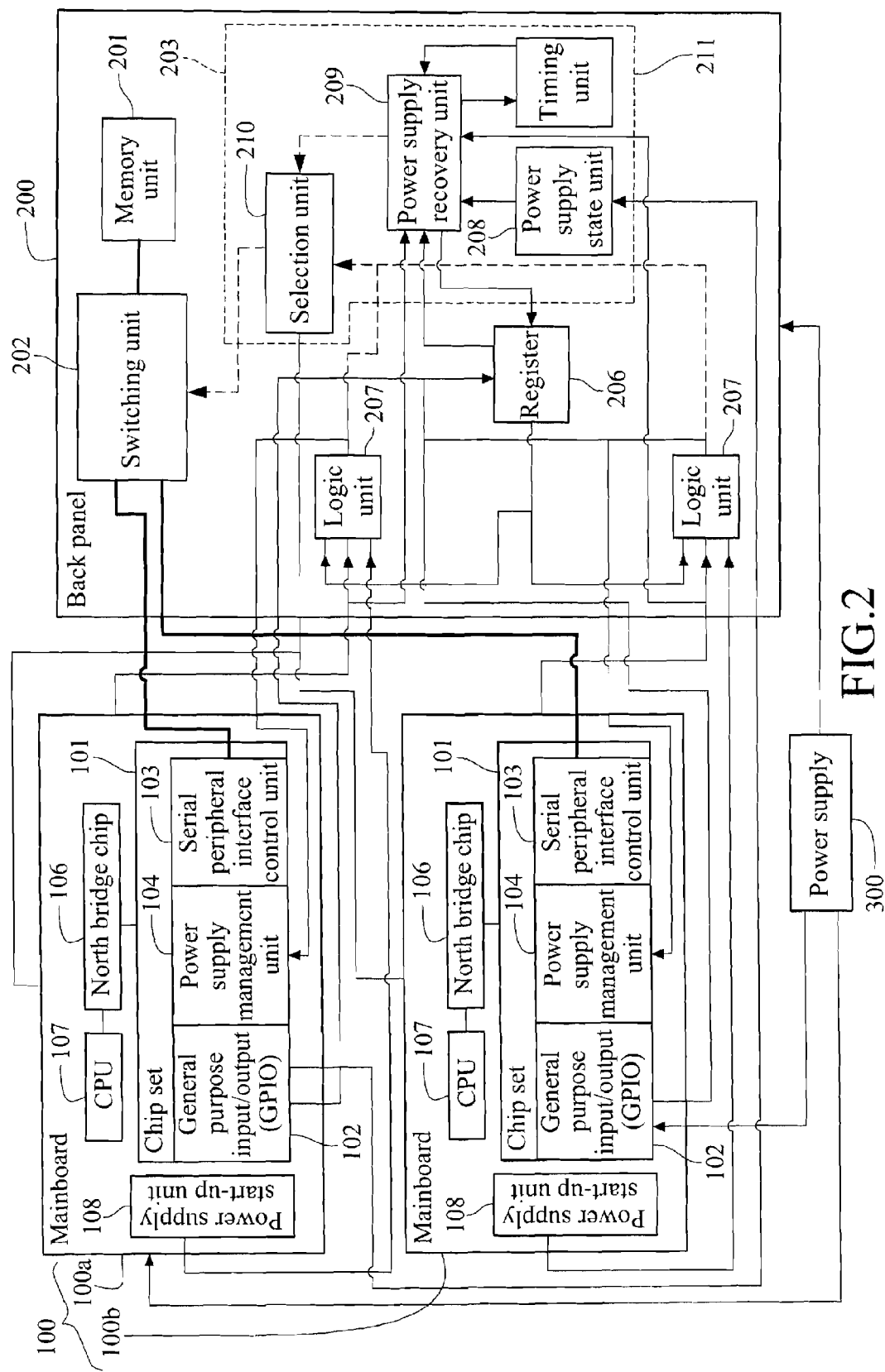
FIG. 2 is a block diagram of a servo device auto-booted upon power supply recovery according to an embodiment of the present invention.

FIG. 2 is a block diagram of a servo device auto-booted upon power supply recovery according to an embodiment of the present invention. Referring to FIG. 2, the servo device auto-booted upon power supply recovery includes a plurality of mainboard 100, a back panel 200, a power supply 300, a memory unit 201, an auto-booting unit 203, a switching unit 202, and a state unit 204.

The state unit 204 includes a register 206 and a logic unit 207. The auto-booting unit 203 includes a power supply state unit 208, a power supply recovery unit 209, a selection unit 210, and a timing unit 211.

The register 206 is electrically connected to each mainboard 100, the power supply recovery unit 209, and each logic unit 207. The logic unit 207 is electrically connected to each mainboard 100 and the selection unit 210. The power supply state unit 208 is electrically connected to the power supply recovery unit 209 and each mainboard 100. The power supply recovery unit 209 is electrically connected to the selection unit 210. The selection unit 210 is electrically connected to the switching unit 202. The timing unit 211 is electrically connected to the power supply recovery unit 209.

The register 206 records the use state of the BIOS used by the mainboard 100 and outputs the state signal according to the recorded use state. The logic unit 207 selects the mainboard 100 intended for receiving the BIOS according to the use state of the BIOS used by the mainboard 100 and the record of the register 206.

Herein, the logic unit 17 may be, but not limited to, an AND gate selectively.

For example, if the use state of the BIOS used by the mainboard 100 is a busy state, the register 206 records the busy state (i.e., the use state) of logic "1" and outputs a busy signal (i.e., the state signal) of logic "1." If the use state of the BIOS used by the mainboard 100 is a non-busy state, the register 206 records an idle state (i.e., the use state) of logic "0" and outputs an idle signal (i.e., the state signal) of logic "0." The idle signal represents that the BIOS may be used by any mainboard 100. Furthermore, the register 206 outputs the state signal of logic "0" or "1" to the power supply recovery unit 209.

When the logic unit 207 receives the idle signal of logic "0" transmitted by the register 206 and receives the booting signal of logic "1" sent from the mainboard 100, the logic unit 207 outputs the selection signal of logic "1" and the switching signal of logic "1" to switch the record in the register 206 to the busy state of logic "1," so as to report that the use state of the BIOS is a busy state.

The power supply state unit 208 records the power supply state of each mainboard 100. The power supply recovery unit 209 sends a control signal according to the state signal and the power supply state when the power supply 300 recovers the supply of power after an abnormal power failure, and sends the switching signal of logic "1" to the register 206 to switch the record in the register 206. The selection unit 210 outputs the selection signal according to the control signal. The timing unit 211 times booting time for each mainboard 100.

For example, each mainboard provides a power supply state of logic "1" to the power supply state unit 208, so that the power supply state unit 208 records the current operation states of each mainboard 100 accordingly. When the power supply 300 recovers the supply of power after an abnormal power failure, the power supply recovery unit 209 determines whether to actuate the mainboard to reboot according to the power supply state of the mainboard recorded before the power failure. In other words, the power supply recovery unit 209 sends the control signal of logic "1" to the selection unit 210 according to the state signal of logic "1" and the power supply signal of logic "1" in the register 206. The selection unit 210 outputs a selection signal of logic "1" to the switching unit 202, so as to determine the mainboard 100 to which the BIOS is to be transmitted.

Furthermore, each mainboard 100 includes a chip set 101. The power supply state unit 208 acquires the power supply state of the mainboard 100 having the chip set 101 through the chip set 101. The mainboard 100 receives the BIOS through the chip set 101. The state unit 204 acquires the use state of the BIOS used by the mainboard 100 having the chip set 101 through the chip set 101.

The chip set 101 includes a general purpose input/output (GPIO) 102, a serial peripheral interface control unit 103, and a power supply management unit 104.

The GPIO 102 is electrically connected to the register 206. The serial peripheral interface control unit 103 is electrically connected to the switching unit 202. The power supply management unit 104 is electrically connected to the logic unit 207.

The power supply state unit 208 acquires the power supply state of the mainboard 100 having the chip set 101 through the GPIO 102. The state unit 204 acquires the use state of the BIOS used by mainboard 100 having the chip set 101 through the GPIO 102. The serial peripheral interface control unit 103 receives the BIOS. The power supply management unit 104 determines whether the power supply of the mainboard 100 is started up.

In this embodiment, the chip set 101 may be a south bridge chip. The mainboard 100 further includes a north bridge chip 106 and a CPU 107, so as to execute computer instruction operation. The south bridge chip (i.e., the chip set 101) is electrically connected to the north bridge chip 106. The north bridge chip 106 is electrically connected to the CPU 24. Basically, the operating principles of the south bridge chip, the north bridge chip, and the CPU are well-known to those skilled in the art, and will not be described here. Furthermore, the south bridge chip and the north bridge chip may also be implemented by an integrated chip. However, the aforementioned description is merely used for illustration instead of limiting the implementation aspects of the present invention.

Figure 3:
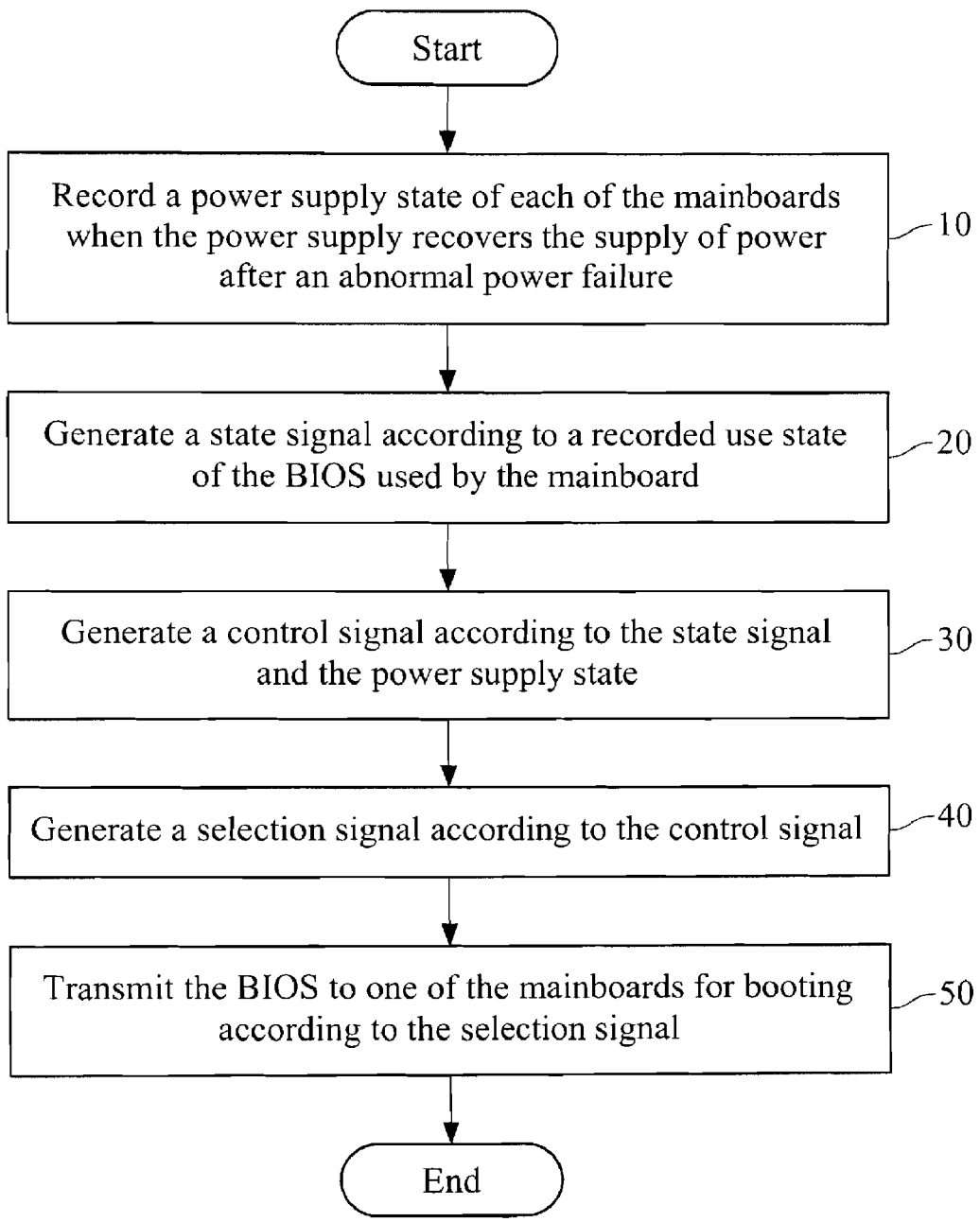
FIG. 3 is a flow chart of processes of auto-booting upon power supply recovery according to an embodiment of the present invention.

Referring to FIGS. 2 and 3, the flow of auto-booting upon power supply recovery according to an embodiment of the present invention will be further described.

Firstly, the power supply state unit 208 records the power supply state of logic "1" for each mainboard 100 when the power supply 300 recovers the supply of power after an abnormal power failure (Step 10). Then, the register 206 outputs the state signal of logic "1" according to the recorded use state of the BIOS used by the mainboard 100 (Step 20). Next, the power supply recovery unit 209 sends the control signal of logic "1" according to the state signal of logic "1" and the power supply state of logic "1," sends a switching signal of logic "1" to the register 206 to switch the record in the register 206, and sends a timing signal of logic "1" to the timing unit 211 (Step 30). Subsequently, the selection unit 210 outputs the selection signal of logic "1" according to the control signal of logic "1" (Step 40). Finally, the switching unit 202 transmits the BIOS to one of the mainboards 100 according to the selection signal of logic "1," and the timing unit 211 begins timing booting time till the mainboard has been booted (Step 50).

The power supply state unit 208 acquires the power supply state of logic "1" of the mainboard 100 having the chip set 101 through the GPIO 102, and the register 206 acquires the use state of logic "1" of the BIOS used by the mainboard 100 having the chip set 101 through the GPIO 102.

When the mainboard 100 receives the BIOS and has been booted, the power supply recovery unit 209 stops the timing of the timing unit 211, and continues to boot a next mainboard 100 according to the aforementioned flow.

In view of the above, the servo device auto-booted upon power supply recovery provided by the present invention provides the BIOS for each mainboard by using an integratedly configured single memory unit, and outputs a selection signal through the auto-booting unit when the power supply recovers the supply of power after an abnormal power failure, so that the switching unit may transmit the BIOS to the mainboard according to the selection signal to execute an automatic booting program.

What is claimed is:

1. A servo device auto-booted upon power supply recovery, comprising:
   a plurality of mainboards;
   a circuit board, electrically connected to the mainboards;
   a power supply, for supplying power required by the mainboards and the circuit board to operate;
   a memory unit, disposed on the circuit board, for storing at least one basic input/output system (BIOS);
   an auto-booting unit, for detecting power supplied by the power supply, wherein when the power supply recovers the supply of power after an abnormal power failure, the auto-booting unit outputs a selection signal;
   a switching unit, disposed on the circuit board and electrically connected to the auto-booting unit, for transmitting the BIOS to one of the mainboards according to the selection signal; and
   a state unit, disposed on the circuit board, for determining a use state of the BIOS used by the mainboard and generating a state signal accordingly;
   wherein the auto-booting unit outputs the selection signal according to the state signal, and the switching unit determines the mainboard intended for receiving the BIOS according to the selection signal;
   wherein the auto-booting unit comprises:
      a power supply state unit, for recording a power supply state of each of the mainboards;
      a power supply recovery unit, electrically connected to the power supply state unit, for sending a control signal according to the state signal and the power supply state when the power supply recovers the supply of power after an abnormal power failure;
      a selection unit, electrically connected to the switching unit, the state unit, and the power supply recovery unit, for outputting the selection signal according to the control signal; and
      a timing unit, electrically connected to the power supply recovery unit, for timing booting time of each of the mainboards.

2. The servo device auto-booted upon power supply recovery according to claim 1, wherein each of the mainboards comprises:
   a chip set, wherein the power supply state unit acquires the power supply state of the mainboard having the chip set through the chip set, the mainboard receives the BIOS through the chip set, and the state unit acquires the use state of the BIOS used by the mainboard having the chip set through the chip set.

3. The servo device auto-booted upon power supply recovery according to claim 2, wherein each of the chip sets comprises:
   a general purpose input/output (GPIO), wherein the power supply state unit acquires the power supply state of the mainboard having the chip through the GPIO, and the state unit acquires the use state of the BIOS used by the mainboard having the chip set through the GPIO; and
   a serial peripheral interface control unit, for receiving the BIOS.

4. A servo device auto-booted upon power supply recovery, comprising:
   a plurality of mainboards;
   a circuit board, electrically connected to the mainboards;
   a power supply, for supplying power required by the mainboards and the circuit board to operate;
   a memory unit, disposed on the circuit board, for storing at least one basic input/output system (BIOS);
   an auto-booting unit, for detecting power supplied by the power supply, wherein when the power supply recovers the supply of power after an abnormal power failure, the auto-booting unit outputs a selection signal;
   a switching unit, disposed on the circuit board and electrically connected to the auto-booting unit, for transmitting the BIOS to one of the mainboards according to the selection signal; and
   a state unit, disposed on the circuit board, for determining a use state of the BIOS used by the mainboard and generating a state signal accordingly;
   wherein the auto-booting unit outputs the selection signal according to the state signal, and the switching unit determines the mainboard intended for receiving the BIOS according to the selection signal;
   wherein the state unit comprises:
      a register, for recording the use state of the BIOS used by the mainboard and outputting the state signal according to the recorded use state;
      wherein the auto-booting unit generates a switching signal to the register when outputting the selection signal, so as to switch a record in the register.

5. The servo device auto-booted upon power supply recovery according to claim 4, wherein each of the mainboards further comprises:
   a chip set, wherein the auto-booting unit acquires the power supply state of the mainboard having the chip set through the chip set, the chip set receives the BIOS, and the register acquires the use state of the BIOS used by the mainboard having the chip set through the chip set.

6. The servo device auto-booted upon power supply recovery according to claim 5, wherein each of the chip sets comprises:
   a GPIO, wherein the auto-booting unit acquires the power supply state of the mainboard having the chip set through the GPIO, and the register acquires the use state of the BIOS used by the mainboard having the chip set through the GPIO; and
   a serial peripheral interface control unit, for receiving the BIOS.

7. The servo device auto-booted upon power supply recovery according to claim 1, wherein each BIOS comprises an entity program segment and corresponds to a mainboard model, the switching unit captures the corresponding entity program segment from the memory unit according to the mainboard model of the mainboard intended for receiving the BIOS and outputs the entity program segment to the mainboard intended for the BIOS.

8. The servo device auto-booted upon power supply recovery according to claim 1, further comprising:
   a plurality of connection units, disposed on the circuit board, each of the connection units being electrically connected to one of the mainboards;
   wherein the state unit and the switching unit communicate with the mainboards through the connection units.

9. The servo device auto-booted upon power supply recovery according to claim 1, further comprising:
   a plurality of connection units, disposed on the circuit board, each of the connection units being electrically connected to one of the mainboard;
   wherein the switching unit communicates with the mainboards through the connection units.

10. The servo device auto-booted upon power supply recovery according to claim 1, wherein the auto-booting unit is disposed on the circuit board.

11. The servo device auto-booted upon power supply recovery according to claim 10, further comprising:
   a plurality of connection units, disposed on the circuit board, each of the connection units being electrically connected to one of the mainboards;
   wherein the switching unit and the auto-booting unit communicate with the mainboards through the connection units.

* * * * *